UNITED STATES PATENT OFFICE.

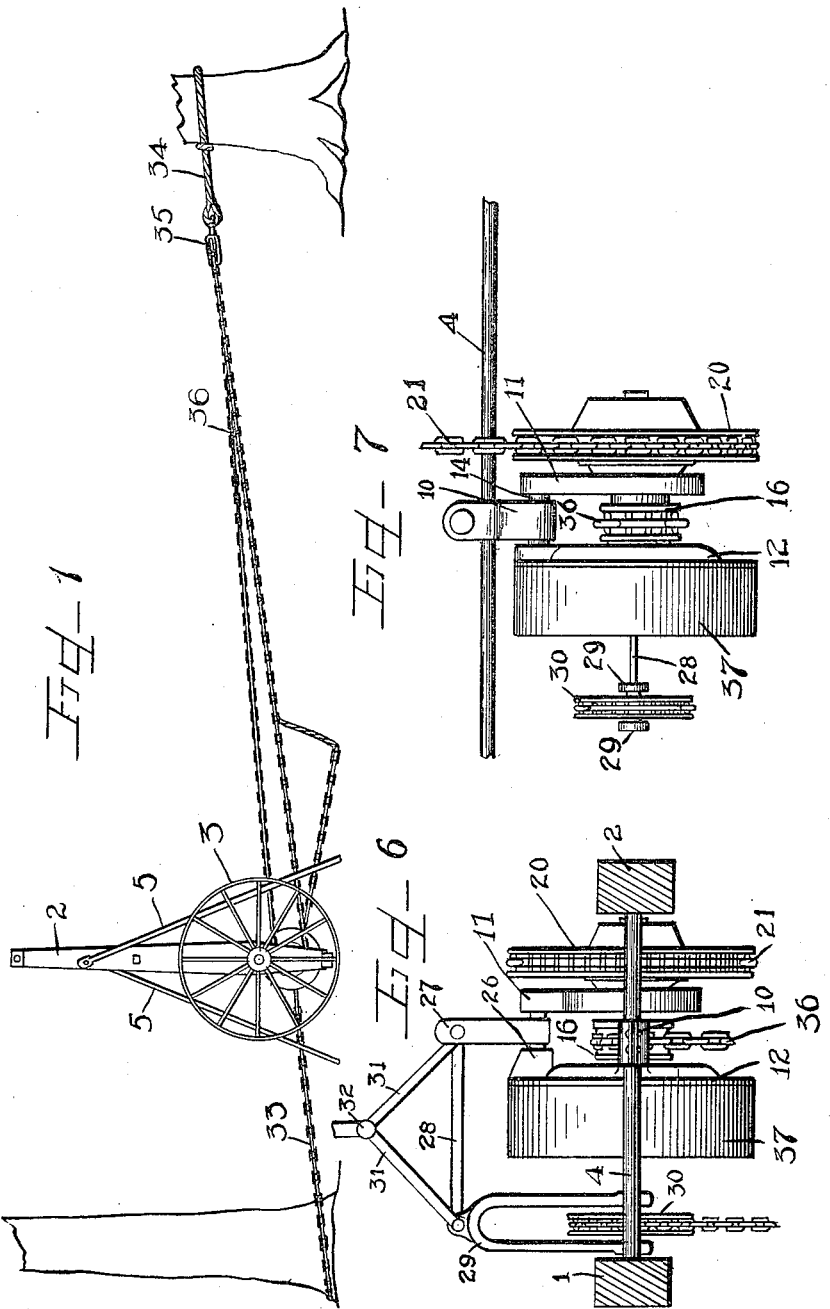

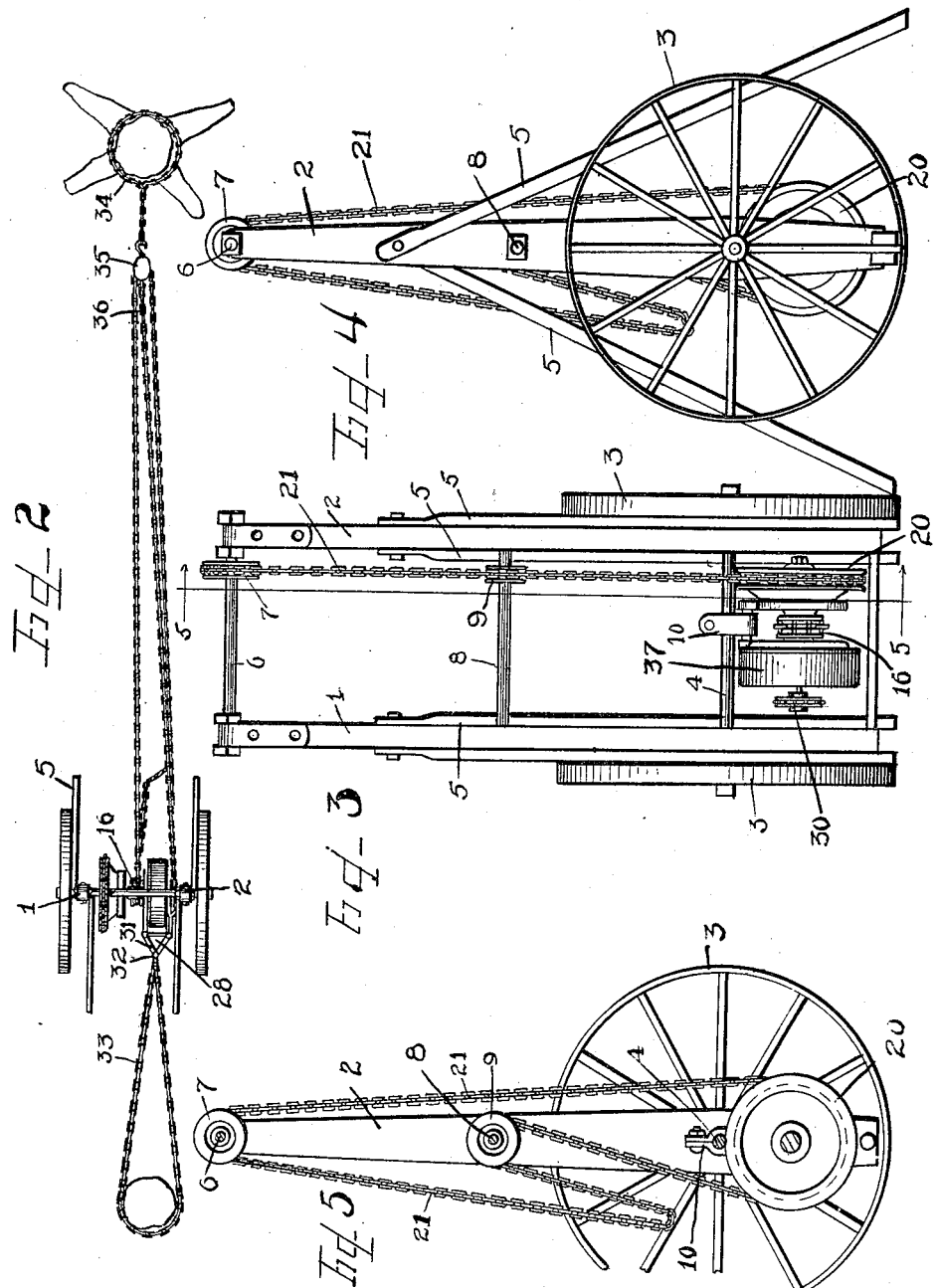

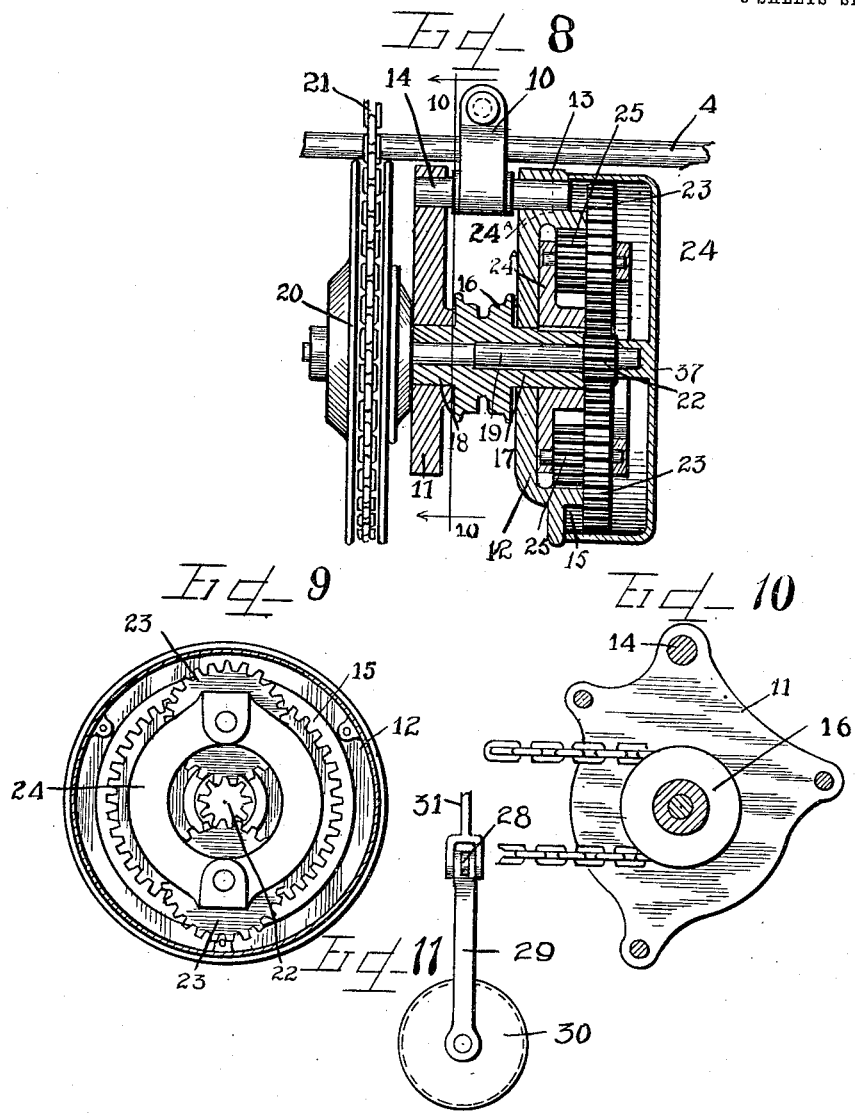

RICHARD O. WIPPERMAN, OF CHICAGO, ILLINOIS.

STUMP-PULLER.

1,130,457. Specification of Letters Patent. Patented Mar. 2, 1915.

Application filed May 26, 1911. Serial No. 629,561.

*To all whom it may concern:*

Be it known that I, RICHARD O. WIPPERMAN, a citizen of the United States, and a resident of the city of Chicago, in the county of Cook and State of Illinois, have invented certain new and useful Improvements in Stump-Pullers; and I do hereby declare that the following is a full, clear, and exact description of the same, reference being had to the accompanying drawings, and to the numbers of reference marked thereon, which form a part of this specification.

Stump pulling machines are usually exceedingly cumbersome. The enormous power required for such uses has usually been attainable only through the use of an exceedingly strong supporting frame or shear mounted upon which are the mechanisms of various kinds used for the purpose of delivering the power from a motor or draft animals in such a manner as to attain the purpose. Owing to the exceedingly heavy construction of such machines, the work is necessarily slow, which is also due to the time required in moving from one position to another in setting preparatory to the work.

The object of this invention is to afford a manually operated stump puller in which only such a frame is required as may be necessary to support the mechanism in moving the same from place to place and in which no part of the stresses exerted by the machine at work is communicated to a supporting frame.

It is an object of the invention to afford a construction in which suitable tackle is installed between the stump to be pulled and a suitable anchorage and whereby an operator standing opposite the machine, may operate the same manually to attain thereby much greater effective results than has heretofore been attainable even by the larger machines.

It is an object of the invention to afford a machine in which the time consumed in the setting of the machine is reduced to a minimum and in which it is only necessary to connect the mechanism with the stump to be pulled and with a suitable anchorage and wherein the only frame used is that afforded by the relatively light hand truck whereby the mechanism is moved from place to place.

The invention embraces many novel features and consists in the matters hereinafter described and more fully pointed out and defined in the appended claims.

In the drawings: Figure 1 is a side elevation of a device embodying my invention, showing the same installed for use. Fig. 2 is a top plan view thereof, with the frame of the truck broken away for clearness of illustration. Fig. 3 is a front elevation thereof. Fig. 4 is a side elevation of the machine. Fig. 5 is a section on line 5—5 of Fig. 3. Fig. 6 is an enlarged top plan view of the truck in section. Fig. 7 is a front elevation with the frame or truck omitted. Fig. 8 is an enlarged vertical section taken through the gear. Fig. 9 is a side elevation of the multiplying gear with the casing or cover removed. Fig. 10 is a section on line 10—10 of Fig. 8. Fig. 11 is an enlarged side elevation of the equalizing gear.

As shown in the drawings: A portable hand truck comprising side frame members 1 and 2, is supported upon wheels 3, by means of an axle 4, near the lower end of said frame members, and brace bars 5, are pivotally supported on the inner and the outer side of each of said frame members 1 and 2, and are adapted to swing outwardly, as shown in Figs. 1 and 4, to support said frame in upright position when at work, and are adapted to swing inwardly and to be engaged in such inward position when the frame is swung downwardly to permit the same to be rolled upon its wheels to the next position or setting. Extending across said frame at the top thereof, is a shaft 6, having a chain sprocket wheel 7, thereon, and extending across the frame near the middle thereof is a corresponding shaft 8, also having a sprocket wheel 9, thereon in alinement with the sprocket wheel 7. Supported on the axle 4, of the machine by means of the clevis or link 10, is a multiplying hoisting gear comprising, as shown, a frame plate 11, and a casing 12, spaced therefrom and having an upwardly extending boss 13, through which and through a corresponding boss on the top of the frame plate extends the expansion shaft 14, wherein the gear is suspended in said link. Said casing 12, is provided with a peripheral flange on its outer side, as shown in Figs. 8 and 9, and said flange is provided with inwardly directed gear teeth affording an internal gear 15. Journaled in said frame plate 11, and the casing 12, at the axis thereof, is a chain sprocket wheel 16, rigidly secured on or integral with the tubular shaft or sleeve 17 and 18, which are journaled respectively in the casing and in said frame plate to rotate therein. Extending axially through said gear and the tubular shaft therefor, is a shaft 19, secured on the outer side of which beyond the frame plate 11, is a large chain sprocket gear 20, in alinement with the chain sprocket gears 7 and 9, on the shafts 6 and 8 respectively, and trained about said chain sprocket gears is an endless chain 21, as shown in Fig. 5, and which is of sufficient length to afford a convenient amount of slack between the sprocket wheels 9 and 7, and at the rear side of the machine, or, in other words, between the machine and the anchorage. Secured on the opposite end of said shaft 19, is a pinion 22, of small size, which meshes with gear wheels 23, on opposite sides thereof, journaled in a spider or frame 24 and 24ª, and concentric with the casing and rigidly secured to, and integral with which are relatively small pinions 25, which mesh with the internal gear 15, before described. Said inner spider or frame member 24ª, is rigidly keyed on the shaft 17, for the power chain sprocket wheel 16, to rotate the same. As shown, a gear cover or casing 37, is secured on the casing 12, to inclose the gears to protect the same from dirt and dust.

Pivotally engaged upon a lug 26, on the side of the casing and at the rear of the sprocket wheel 16, is a rearwardly directed link 27, and connected with which is a spreader bar 28, which at its opposite end is pivotally engaged on a yoke 29, which projects forwardly between the frame bar 1, and the casing, and journaled between the arms of which is a chain sprocket wheel 30. Links 31, extend from the opposite ends of the spreader bar rearwardly and are connected by means of any suitable clevis, shackle or toggle 32, with the anchor chain 33, which is engaged about any object such as a growing tree, or may be even attached to a dead man buried in the ground to afford sufficient anchorage.

The machine is made fast to the stump or object to be moved by means of a suitable sling 34, which may, of course, be attached directly to the stump or to a lever lashed thereto, as preferred, or in any manner to effectively apply the power. Connected in said sling is a tackle block, as shown, a single block or chain sheave 35. One end of the power chain 36, is connected with the strap or eye of said block and the chain is led around the sheave 30, in the yoke 29, thence back and through the block 35, thence around the smaller sheave 16, and the fall or end thereof is attached to the chain returning to the block 35, thus affording a practically endless chain to enable the movement of the chain toward the block 35, to take up the slack of the chain from the chain sheave 16, which is substantially of the same size.

The operation is as follows: Having connected up the machine with the stump to be pulled and with a suitable anchorage, as shown in Fig. 1, the operator stands between the machine and the anchorage facing the stump, and pulls upon the power chain 21, thereby rotating the large power sprocket wheel 20, and thereby the shaft 19. This rotation is communicated by the pinion 22, to the gears 23, and thence to the pinions 25, which mesh with the stationary internal gear 15. In consequence, the internal frame or spider in which the gear wheels 23, are journaled is forced to rotate upon its axis driving thereby the power sprocket wheel 16, about which the fall of the chain 36, is trained. As the chain is drawn through the block 35, and sheave 30, the stress exerted is multiplied enormously owing to the successive reductions in speed of the drive afforded from the construction before described, and in consequence a proportionally greater pulling effect is attained at the stump or object to which the pulling stress is applied. Inasmuch as the end of the fall is attached to the outrunning lead of chain passing through the block 35, it follows that the slack is taken up as rapidly as produced by the movement of the outgoing lead of chain. In consequence, a second operator is not required, and one man operating the power chain 21, may readily develop sufficient energy at the block 35, to serve the purpose for which the machine is designed, that is to say, to pull practically any stump. Of course, the power applied must depend to an extent, upon the size of the large power sprocket wheel 20, and the relative sizes of the remaining sporcket wheels and gear wheels for driving the same. Whatever the power exerted, however, no stress whatever need be exerted upon the truck, inasmuch as the only weight sustained thereby is merely the weight of the mechanism which is free to swing upon the clevis 10. When the work is accomplished, the machine may be almost instantly moved to another setting, for this purpose it being only necessary to release the sling and release the anchor chain, swing the braces inwardly to the frame at one side the machine, swing the frame downwardly to a nearly horizontal position and load the chains thereon, when the machine may be moved by the operator upon its own wheels to the next position or setting, where, of course, the operation may be repeated as before described.

Of course, details of the construction may be varied. I therefore do not purpose limiting the patent granted on this application otherwise than necessitated by the prior art.

I claim as my invention:

1. A truck, a multiplying gear mounted thereon, an endless power chain for operating the same, an equalizer bar connected with the multiplying gear, an independent sheave connected with the equalizing bar, an anchor chain connected with the equalizing bar, a block attached to the object to be moved, a pulling chain attached at one end thereto and trained around said independent chain sheave, thence through said block and thence around the weight sheave of the multiplying gear, the otherwise free end of said chain being attached to the return lead of the chain from the independent gear to the block.

2. A supporting frame, a power multiplying chain hoisting gear suspended thereon, an endless power chain for operating the same, an equalizer bar connected with the multiplying gear, an independent chain sheave carried on the equalizing bar, an anchor chain connected with the equalizing bar, a block attached to the object to be moved, a pulling chain attached at one end thereto and trained around said independent chain sheave, thence through said block and thence around the weight sheave of the multiplying gear, and the end thereof attached to the return lead of the chain from the independent gear to the block.

3. A portable frame, a multiplying chain hoisting gear mounted thereon, means for operating the same, an equalizer bar connected with the multiplying gear, an independent chain sheave secured thereto, anchoring means connected with the equalizing bar, a block attached to the object to be moved, a pulling chain attached at one end thereto and trained around said independent chain sheave, thence through said block and thence around the weight sheave of the multiplying gear, the fall end of said chain being attached to the return lead of the chain from the independent gear to the block.

4. A machine of the class described embracing a frame, and wheels affording a truck, a power multiplying chain hoisting gear swingingly supported on said frame, an anchor chain attached to the gear casing and adapted for engagement with a fixed object, means for actuating the hoisting gear, a sheave attached to the body to be moved, and a weight moving chain trained through said sheave and about the weight sheave or sheaves of the multiplying gear.

5. A machine of the class described embracing a frame, an axle extending therethrough near one end thereof, supporting wheels on said axle, a brace for supporting the frame vertically, a power multiplying hoisting gear swingingly supported on said axle, a chain sheave on the frame, a power chain trained about said sheave and about the power sheave of the hoisting gear, an independent sheave to operate with the gear, a sheave attached to the body to be moved, a weight moving chain trained through said sheave and said independent sheave and about the weight sheave or sheaves of the multiplying gear, and anchoring means secured to the gear casing and extending in alinement with the draft.

6. A machine of the class described embracing a frame, an axle extending therethrough near one end thereof, supporting wheels on said axle, a power multiplying chain hoisting gear and its chain swingingly supported on said axle, means for actuating the same, an anchor chain attached to the gear casing and adapted for engagement with a fixed object in the line of draft with the object to be moved whereby the draft is wholly removed from the frame.

7. The combination with a two wheel truck, of braces secured to the truck frame to support the frame perpendicularly on its wheels, a multiplying hoisting gear swingingly supported on the axle, a chain extending in the line of draft for anchoring the gear from forward movement, a chain sheave also attached to the anchor chain, a power chain for driving said hoisting gear, and a tackle connecting the object to be moved with the weight moving sheaves on said hoisting gear whereby the stress is wholly removed from the frame.

8. The combination with a two wheel truck adapted for adjustment to afford an upright frame, a multiplying hoisting gear swingingly supported on the axle, means for actuating the same, means acting in the line of draft for anchoring said gear from movement, a chain sheave also attached to the anchor chain, a chain trained through said sheave through a sheave on the object to be moved and the weight sheave of the hoisting gear, the fall of said chain being connected with an outwardly moving lead thereof to take up the slack as produced.

9. In a stump pulling machine the combination with a two wheel truck, of a chain hoisting gear and its chains swingingly supported upon the axle thereof, braces secured to the truck frame to support the frame perpendicularly on its wheels, an anchor chain acting in alinement with the draft of the pulling chain, said truck serving only to transport the machine and support the weight of the gear.

10. A machine of the class described consisting of a frame, a power multiplying hoisting gear swingingly supported by said frame, an anchor chain attached to the gear casing of said gear and adapted for engagement with a fixed object other than the frame, means for actuating the hoisting gear, a sheave attached to the body to be moved, and a weight moving chain trained through said sheave and about a weight sheave of the multiplying gear.

11. A machine of the class described consisting of a frame, a power multiplying hoisting gear supported thereby, an anchor chain attached to the gear casing and adapted for engagement with a fixed object other than the frame, means for actuating the hoisting gear, a sheave attached to the body to be moved, and a weight moving chain trained through said sheave and about the weight sheave or sheaves of the multiplying gear.

12. A machine of the class described consisting of a frame, a power multiplying chain hoisting gear and its chain swingingly suspended from said frame, means for actuating said gear, and an anchor chain attached to the gear casing and adapted for engagement with a fixed object in the line of draft with the object to be moved, whereby the draft will be wholly removed from the frame.

13. In a stump pulling machine, the combination with a supporting frame, of a chain hoisting gear and its chains swingingly supported by said frame, braces secured to said frame for supporting same in an upright position, and an anchor chain acting in alinement with the draft of the pulling chain irrespective of the support for said chains.

14. In a device of the class described for pulling stumps, means for attachment to the stump, a support, mechanism connected with said means and adapted for attachment to a fixed anchorage to receive the reaction of the pull on the stump, and an adjustable element for supporting and permitting alinement of the anchorage mechanism and the stump means to obviate any of the stress therebetween being exerted on the support.

In testimony whereof I have hereunto subscribed my name in the presence of two subscribing witnesses.

RICHARD O. WIPPERMAN.

Witnesses:
LAWRENCE REIBSTEIN,
CHARLES W. HILLS, Jr.

Copies of this patent may be obtained for five cents each, by addressing the "Commissioner of Patents, Washington, D. C."